United States Patent
Ceponkus et al.

(10) Patent No.: US 8,548,450 B2
(45) Date of Patent: Oct. 1, 2013

(54) SCROLLING BASED PAGINATION BY MOBILE WIRELESS COMMUNICATIONS DEVICE AND METHOD THEREOF

(75) Inventors: Alexander Vitas Ceponkus, Ancaster (CA); Paul Munguia, Coconut Creek, FL (US)

(73) Assignee: BlackBerry Limited, Waterloo, Ontario (CA)

(*) Notice: Subject to any disclaimer, the term of this patent is extended or adjusted under 35 U.S.C. 154(b) by 0 days.

(21) Appl. No.: 13/091,604

(22) Filed: Apr. 21, 2011

(65) Prior Publication Data

US 2011/0263231 A1   Oct. 27, 2011

Related U.S. Application Data

(60) Provisional application No. 61/327,395, filed on Apr. 23, 2010.

(51) Int. Cl.
*H04M 3/00* (2006.01)

(52) U.S. Cl.
USPC ..... 455/418; 455/414.1; 455/566; 455/550.1; 455/556.2; 345/650; 345/684; 345/689; 715/825; 715/711; 715/772; 715/787

(58) Field of Classification Search
USPC ............... 455/414.1, 566, 575.1, 550.1, 418, 455/556.2; 715/825, 711, 722, 787, 781; 709/203, 215–220; 345/650, 684, 689
See application file for complete search history.

(56) References Cited

U.S. PATENT DOCUMENTS

| | | |
|---|---|---|
| 2006/0230030 A1 | 10/2006 | Volpa et al. |
| 2007/0186182 A1 | 8/2007 | Schiller |
| 2008/0079972 A1* | 4/2008 | Goodwin et al. ............ 358/1.12 |
| 2008/0313566 A1* | 12/2008 | Barnum et al. .............. 715/825 |
| 2009/0070707 A1 | 3/2009 | Schaller et al. |
| 2009/0183073 A1 | 7/2009 | Scriver et al. |

* cited by examiner

*Primary Examiner* — Vladimir Magloire
*Assistant Examiner* — Babar Sarwar

(57) ABSTRACT

A mobile wireless communications device may include a housing, and a wireless transceiver carried by the housing. The mobile wireless communications device may also include a display carried by the housing, and a controller carried by the housing and coupled to the display and the wireless transceiver. The controller may be configured to wirelessly download a first page from among a plurality of pages collectively including a sequential listing of a plurality of selectable files. The controller may also be configured to display the first page with a scrollable cursor thereon, and wirelessly download a second page based upon the scrollable cursor being positioned at a threshold number of selectable files in the first page.

24 Claims, 4 Drawing Sheets

SCROLLING BASED PAGINATION BY MOBILE WIRELESS COMMUNICATIONS DEVICE AND METHOD THEREOF

RELATED APPLICATION

The present application is based upon previously filed provisional application Ser. No. 61/327,395, filed Apr. 23, 2010, the entire subject matter of which is incorporated by reference in its entirety.

TECHNICAL FIELD

The present disclosure relates to the field of wireless communications, and, more particularly, to mobile wireless communications devices with pagination and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the Internet via a cellular network and/or a wireless local area network (LAN), for example.

Navigating a list of data is a function performed on a mobile wireless communications device. For example, navigating a list of data on a mobile wireless communications device may be performed by a document management application on the mobile wireless communications device. The document management application may display a listing of files, folders, and subfolders, for example. During navigation of a folder, the folder's contents may be displayed in the form of a list.

DETAILED DESCRIPTION

Figure 1:
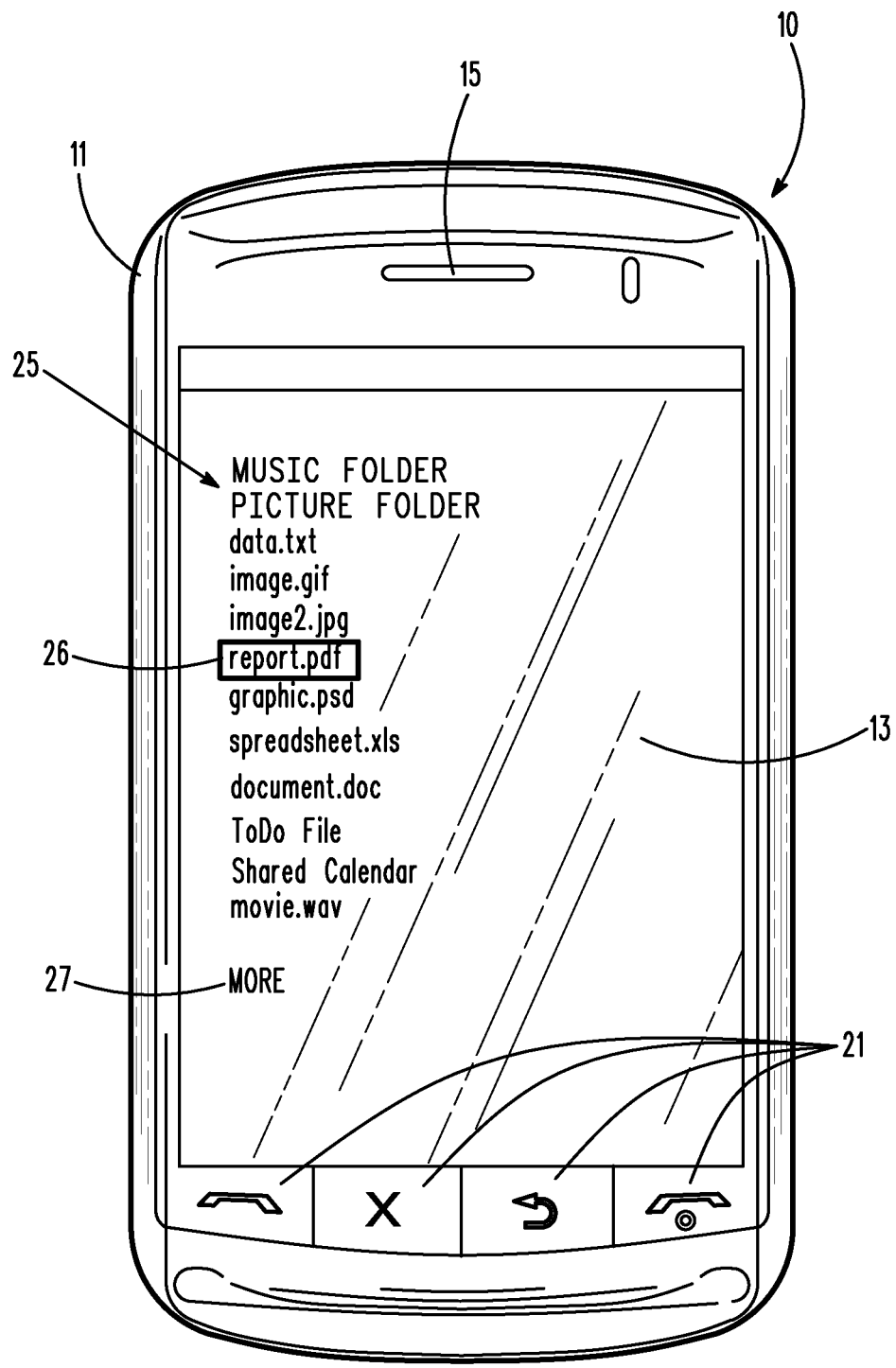
FIG. 1 is a plan view of a mobile wireless communications device illustrating a page of selectable files according to an exemplary embodiment.

The present description is made with reference to the accompanying drawings, in which various example embodiments are shown. However, many different example embodiments may be used, and thus the description should not be construed as limited to the example embodiments set forth herein. Rather, these example embodiments are provided so that this disclosure will be thorough and complete. Like numbers refer to like elements throughout.

In accordance with one exemplary aspect, a mobile wireless communications device may include a housing, and a wireless transceiver carried by the housing. The mobile wireless communications device may also include a display carried by the housing and a controller carried by the housing and coupled to the display and the wireless transceiver.

The controller may be configured to wirelessly download a first page from among a plurality of pages collectively including a sequential listing of a plurality of selectable files. The controller may also be configured to display the first page with a scrollable cursor thereon. The controller may further be configured to wirelessly download a second page based upon the scrollable cursor being positioned at a threshold number of selectable files in the first page.

The plurality of pages may include a plurality of divisions of the sequential listing of the plurality of selectable files. The controller may be further configured to append a top of the second page to a bottom of the first page. The selectable files may include at least one of selectable address book files, selectable calendar files, selectable folder files, and selectable media files. The controller may be configured to at least one of open, download, copy, move, and delete the selectable files.

The threshold number of selectable files may be at least half a number of selectable files on the first page. The controller may be further configured to display an indicator that the second page is available.

The mobile wireless communications device may further include an input device coupled to the controller. The controller may be configured to position the scrollable cursor on the display based upon the input device. The wireless transceiver may include a cellular telephone transceiver.

A related method is also provided. The method aspect is directed to downloading a plurality of pages in a mobile wireless communications device comprising a housing, a wireless transceiver carried by the housing, a display carried by the housing, and a controller carried by the housing and coupled to the display and the wireless transceiver. The method may include using the controller to download the plurality of pages by at least wirelessly downloading a first page from among the plurality of pages collectively including a sequential listing of a plurality of selectable files. The method may also include using the controller to download the plurality of pages by at least displaying the first page on the display with a scrollable cursor thereon, and wirelessly downloading a second page based upon the scrollable cursor being positioned at a threshold number of selectable files in the first page.

A related computer-readable medium aspect is directed to a non-transitory computer-readable medium for use with a mobile wireless communications device, such as the one described briefly above. The non-transitory computer-readable medium may have computer-executable instructions for causing the mobile wireless communications device to perform various steps. The steps may include wirelessly downloading a first page from among the plurality of pages collectively including a sequential listing of a plurality of selectable files. The steps may also include displaying the first page on the display with a scrollable cursor thereon, and wirelessly downloading a second page based upon the scrollable cursor being positioned at a threshold number of selectable files in the first page.

Figure 2:
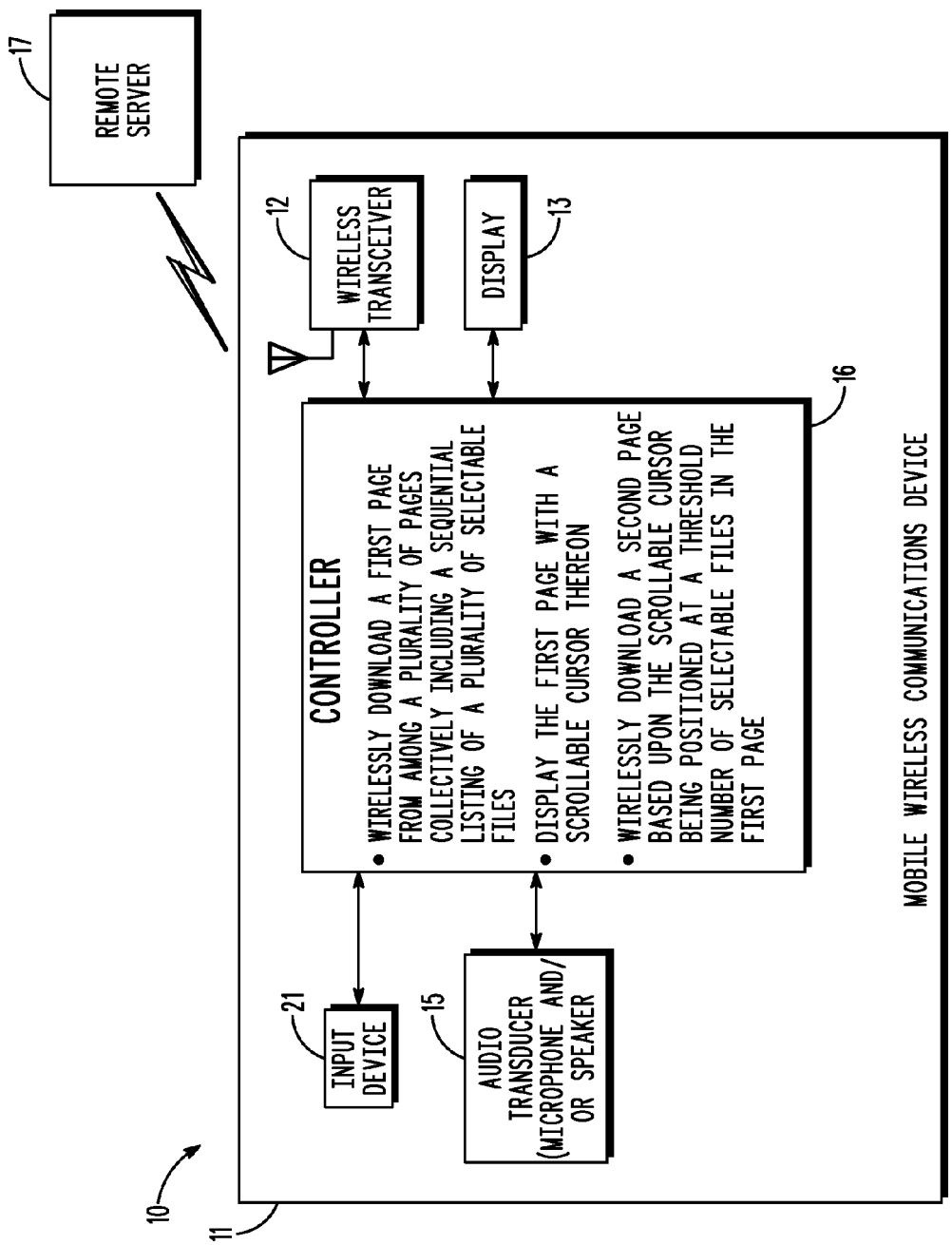
FIG. 2 is a schematic block diagram of the mobile wireless communications device of FIG. 1 and a remote server, according to an exemplary embodiment.

Referring initially to FIGS. 1 and 2, a mobile wireless communications device 10 illustratively includes a housing 11, a wireless transceiver 12 carried by the housing, and a display 13 carried by the housing.

The mobile wireless communications device 10 also illustratively includes an audio transducer 15 carried by the housing 11. The audio transducer 15 may be a microphone, for example. The audio transducer 15 may also be a speaker. In some example embodiments, there may be more than one audio transducer 15, for example, a microphone and speaker may be used and carried by the housing 11.

The mobile wireless communications device 10 includes one or more input devices 21. The input devices 21 illustratively include push buttons for cooperating with the controller 16 to position a scrollable cursor 26 on the display 13. In some example embodiments, the input device 21 may be an alphanumeric keypad, trackball, or other input device for cooperating with the controller 16 to position the scrollable cursor 26, for example. Still further, an input device 21 may be coupled to the display 13 to accept a touching input therefrom and cooperate with the controller 16, to position the scrollable cursor 26, for example.

The controller 16 is also carried by the housing 11 and cooperates with the wireless transceiver 12 to perform at least one mobile wireless communications function. For example, the wireless transceiver 12 may be a cellular transceiver or a WiFi transceiver, for example, and may cooperate with the controller 16 to communicate data or voice communications, or both. Other types of wireless transceivers and mobile wireless communications functions will be appreciated by those skilled in the art. The controller 16 may be implemented using hardware (e.g., memory, etc.) and software components, i.e., computer-readable instructions for causing the mobile wireless communications device 10 to perform the various functions or operations described herein.

The controller 16 is configured to wirelessly download a first page from among a plurality of pages. The first page may be wirelessly downloaded from a remote server 17, for example, a remote data server, coupled to a wireless network.

The pages collectively include a sequential listing of selectable files 25. The selectable files 25 may include selectable address book files, selectable calendar files, selectable folder files, selectable media files, and to-do task files. The selectable files 25 may also be shortcut files to other selectable files or data items. Other file types may also be included. The sequential listing of selectable files 25 may resemble a Microsoft Windows Explorer detailed view, for example. Of course, the pages may include other configurations of a sequential listing of selectable files.

The controller 16 is also configured to display the first page with the scrollable cursor 26 thereon. The controller 16 advantageously cooperates with the input device 21 to move the scrollable cursor 26 through the sequential listing of selectable files. The scrollable cursor 26 may highlight a corresponding selectable file in the sequential listing 25 to identify the location of the scrollable cursor. The position of the scrollable cursor 26 in the sequential listing 25 may be identified by other display characteristics.

The controller 16 may perform actions on each of the selectable files, and more particularly, the selectable file highlighted by the scrollable cursor 26. For example, the controller 16 may open, download, copy, move, and delete each selectable file in the sequential list 25.

The controller 16 is also configured to wirelessly download a second page based upon the scrollable cursor 26 being positioned at, or above (i.e. past), a threshold number of selectable files in the first page. For example, the threshold number of selectable files may be set to at least half of a total number of selectable files on the first page. In other words, if the scrollable cursor 26 scrolls up to or past a threshold one of the selectable files, the second page is wirelessly downloaded.

The threshold number of selectable files may be set based upon device capabilities, for example, the display and wireless network speeds. Additionally, the total number of selectable files on the first page and subsequent pages may be set to any number, and may be based upon capabilities of the mobile wireless communications device 10, for example, the display, and network speeds. Other factors may be considered for determining the total number of selectable files per page and the threshold number.

The second page is wirelessly downloaded and a top thereof is appended to the bottom of the first page. In other words, the first and second pages are merged and displayed as a single scrollable page. The wireless downloading of the second page based upon the scrollable cursor 26 being positioned at the threshold number of selectable files in the first page advantageously improves usability by reducing wait times between page downloads. The use of hyperlinks to download or navigate between pages is also reduced. Space associated with the hyperlinks on the display is also reduced. Bandwidth usage is also reduced, thus resulting in cost savings.

The wireless downloading is advantageously performed or processed in the background. In other words, there may be nothing in the display indicating the second page is being wirelessly downloaded.

In some embodiments, the controller 16 also advantageously displays an indicator 27 at the bottom of the first page that the second page is available. For example, the indicator 27 may be displayed if the second page is not downloaded and displayed prior to the scrollable cursor 26 reaching the bottom of the first page. This may occur if the scrollable cursor 26 is scrolled from the threshold position to the end of the first page too quickly. The second page may not be downloaded and displayed prior to the scrollable cursor 26 reaching the bottom of the first page because of network or device delay or connectivity during the download. Once the second page is wirelessly downloaded, the second page replaces the indicator 27.

Additionally, while reference is made to first and second pages, it will appreciated by those skilled in the art that the embodiments described herein are applicable to additional or subsequent pages. For example, after the second page has been wirelessly downloaded, the controller 16 may be configured to wirelessly download a third page similar to how the second page was wirelessly downloaded, and so on. Moreover, while reference is made to pages, it should be noted that the term pages may refer to divisions of the sequential listing of selectable files or data. In addition, the term pages may refer to a predetermined amount of selectable file names or other data that may be simultaneously viewed on the display 13 or any other logical separation or division of data.

Figure 3:
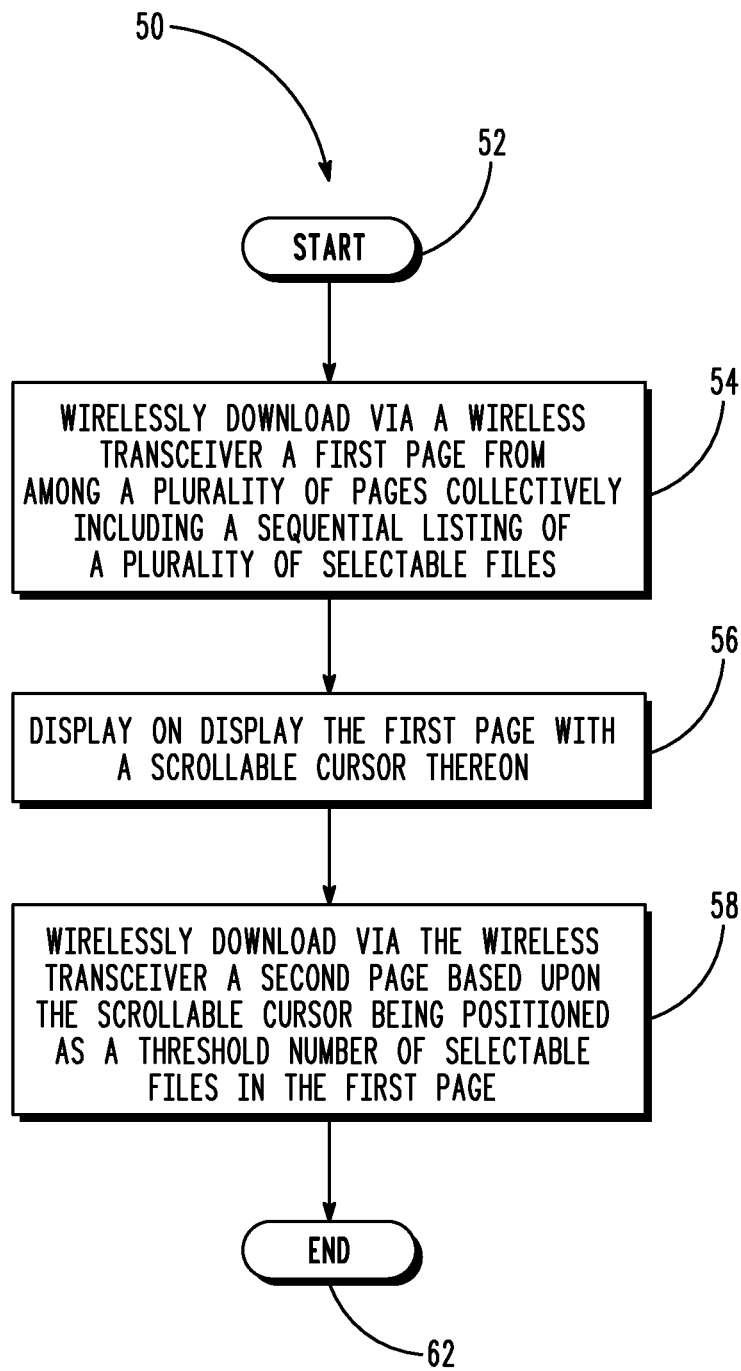
FIG. 3 is a flow chart illustrating a method of scrolling based pagination, according to an exemplary embodiment.

Referring now additionally to the flowchart 50 in FIG. 3, a method of downloading in a mobile wireless communications device 10 is described. Beginning at Block 52, the method includes wirelessly downloading, via a wireless transceiver 12, a first page from among a plurality of pages collectively including a sequential listing of a plurality of selectable files (Block 54). The method also includes displaying, on a display 13, the first page with a scrollable cursor thereon (Block 56). The method also includes wirelessly downloading, via the wireless transceiver 12, a second page based upon the scrollable cursor being positioned at a threshold number of selectable files in the first page (Block 58). The method ends at Block 62.

It will be appreciated that any module or component exemplified herein that executes instructions, for example, the controller 16, may include or otherwise have access to computer readable media such as storage media, computer storage media, or data storage devices (removable and/or non-removable) such as, for example, magnetic disks, optical disks, or tape. Computer storage media may include volatile and nonvolatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile wireless communications device 10, etc., or accessible or connectable thereto. Any application or module herein described may be implemented using computer readable/executable instructions that may be stored or otherwise held by such computer readable media.

Exemplary components of a mobile wireless communications device 1000 that may be used in accordance with the above-described embodiments are further described below with reference to FIG. 4. The device 1000 illustratively includes a housing 1200, a keypad 1400 and an output device 1600. The output device shown is a display 1600, which may comprise a full graphic LCD. Other types of output devices may alternatively be utilized. The keypad 1400 may be a physical keypad including alphanumeric buttons. Alternatively or additionally, the keypad 1400 may be a "soft" keypad implemented, for example, by providing images of keys on the display 1600. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 4:
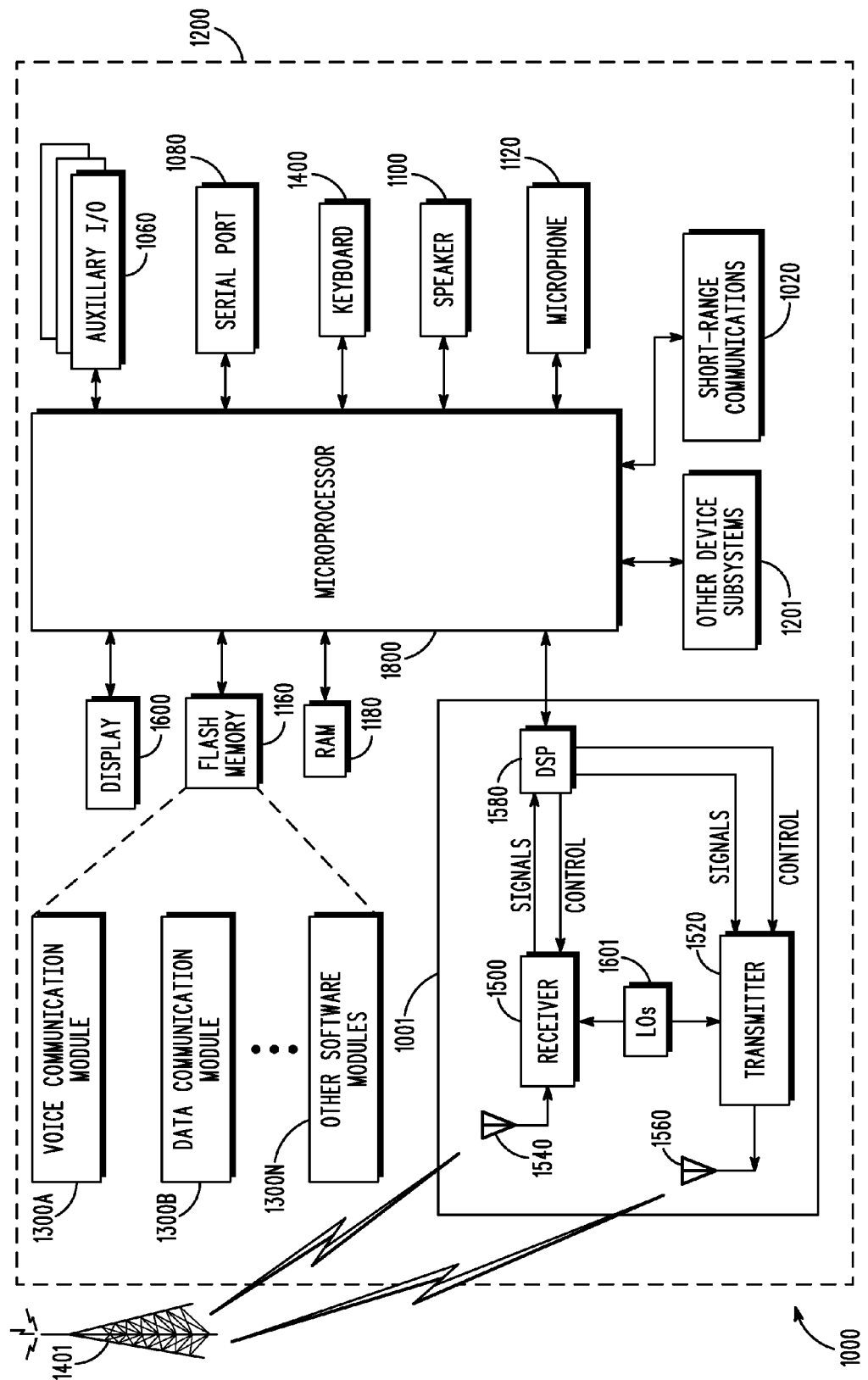
FIG. 4 is a schematic block diagram illustrating exemplary components which may be used in the mobile wireless communications devices of FIGS. 1 and 2.

In addition to the processing device 1800, other parts of the mobile device 1000 are shown schematically in FIG. 4. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TACT™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog-to-digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a BLUETOOTH™ communications module to provide for communication with similarly-enabled systems and devices.

Many modifications and other example embodiments of the present disclose will come to the mind of one skilled in the art having the benefit of the teachings presented in the foregoing descriptions and the associated drawings. Therefore, it is understood that the present disclosure is not to be limited to the specific example embodiments disclosed, and that modifications and example embodiments are intended to be included within the scope of the appended claims.

That which is claimed is:

1. A mobile wireless communications device comprising:
   a housing;
   a wireless transceiver carried by said housing;
   a display carried by said housing; and
   a controller carried by said housing and coupled to said display and said wireless transceiver, said controller configured to
   wirelessly download a first page from among a plurality of pages collectively including a sequential listing of a plurality of selectable files, wherein the plurality of pages comprises a plurality of divisions of the sequential listing of the plurality of selectable files,
   display the first page with a scrollable cursor thereon,
   wirelessly download a second page based upon the scrollable cursor being positioned at a threshold number of selectable files in the first page,
   merge the first and second pages, and
   display the merged first and second pages as a single scrollable page in which selectable files in the first page and selectable files in the second page are scrollable.

2. The mobile wireless communications device according to claim 1, wherein said controller is further configured to append a top of the second page to a bottom of the first page.

3. The mobile wireless communications device according to claim 2, wherein the first and second pages are merged and displayed as a single scrollable page.

4. The mobile wireless communications device according to claim 1, wherein the selectable files comprise at least one of selectable address book files, selectable calendar files, selectable folder files, and selectable media files.

5. The mobile wireless communications device according to claim 1, wherein said controller is configured to at least one of open, download, copy, move, and delete the selectable files.

6. The mobile wireless communications device according to claim 1, wherein the threshold number of selectable files is at least half a number of selectable files on the first page.

7. The mobile wireless communications device according to claim 1, wherein said controller is further configured to display an indicator that the second page is available.

8. The mobile wireless communications device according to claim 7, wherein said controller is further configured to wirelessly download and display the second page in place of the indicator.

9. The mobile wireless communications device according to claim 1, further comprising an input device coupled to said controller; and wherein said controller is configured to position the scrollable cursor on said display based upon said input device.

10. The mobile wireless communications device according to claim 1, wherein said wireless transceiver comprises a cellular telephone transceiver.

11. The mobile wireless communications device according to claim 1, wherein the threshold number of selectable files is variable based on capabilities of the mobile wireless communications device.

12. A method of downloading a plurality of pages in a mobile wireless communications device comprising a housing, a wireless transceiver carried by the housing, a display carried by the housing, and a controller carried by the housing and coupled to the display and the wireless transceiver, the method comprising:
   using the controller to download the plurality of pages by at least wirelessly downloading a first page from among the plurality of pages collectively including a sequential listing of a plurality of selectable files, wherein the plurality of pages comprises a plurality of divisions of the sequential listing of the plurality of selectable files,
   displaying the first page on the display with a scrollable cursor thereon, wirelessly downloading a second page based upon the scrollable cursor being positioned at a threshold number of selectable files in the first page,
   merge the first and second pages, and
   display the merged first and second pages as a single scrollable page in which selectable files in the first page and selectable files in the second page are scrollable.

13. The method according to claim 12, wherein using the controller to download the plurality of pages further comprises using the controller to append a top of the second page to a bottom of the first page.

14. The method according to claim 13, further comprising using the controller to merge and display the first and second pages as a single scrollable page.

15. The method according to claim 12, wherein using the controller to download the plurality of pages further comprises using the controller to at least one of open, download, copy, move, and delete the selectable files.

16. The method according to claim 12, wherein the threshold number of selectable files is at least half a number of selectable files on the first page.

17. The method according to claim 12, wherein the threshold number of selectable files is variable based on capabilities of the mobile wireless communications device.

18. The method according to claim 12, further comprising using the controller to display an indicator that the second page is available.

19. The method according to claim 18, further comprising using the controller to wirelessly download and display the second page in place of the indicator.

20. A non-transitory computer-readable medium for use with a mobile wireless communications device comprising a housing, a wireless transceiver carried by the housing, a display carried by the housing, and a controller carried by the housing and coupled to the display and the wireless transceiver, the non-transitory computer-readable medium having computer-executable instructions for causing the mobile wireless communications device to perform steps comprising:
- wirelessly downloading a first page from among a plurality of pages collectively including a sequential listing of a plurality of selectable files, wherein the plurality of pages comprises a plurality of divisions of the sequential listing of the plurality of selectable files;
- displaying the first page on the display with a scrollable cursor thereon; wirelessly downloading a second page based upon the scrollable cursor being positioned at a threshold number of selectable files in the first page;
- merging the first and second pages; and
- displaying the merged first and second pages as a single scrollable page in which selectable files in the first page and selectable files in the second page are scrollable.

21. The non-transitory computer-readable medium according to claim 20, wherein the computer-executable instructions are for causing the mobile wireless communications device to further perform the step of appending a top of the second page to a bottom of the first page.

22. The non-transitory computer-readable medium according to claim 20, wherein the computer-executable instructions are for causing the mobile wireless communications device to further perform the step of at least one of opening, downloading, copying, moving, and deleting the selectable files.

23. The non-transitory computer-readable medium according to claim 20, wherein the threshold number of selectable files is at least half a number of selectable files on the first page.

24. The non-transitory computer-readable medium according to claim 20, wherein the computer-executable instructions are for causing the mobile wireless communications device to further perform the step of displaying an indicator that the second page is available.

\* \* \* \* \*